United States Patent [19]

Matsumoto

[11] Patent Number: 4,819,506
[45] Date of Patent: Apr. 11, 1989

[54] POWER TRANSMITTING SYSTEM FOR A FOUR-WHEEL DRIVE VEHICLE

[75] Inventor: Rempei Matsumoto, Ohta, Japan

[73] Assignee: Fuji Jukogyo Kabushiki Kaisha, Tokyo, Japan

[21] Appl. No.: 72,159

[22] Filed: Jul. 10, 1987

[30] Foreign Application Priority Data

Jul. 18, 1986 [JP] Japan .................. 61-169272
Jul. 18, 1986 [JP] Japan .................. 61-169274
Jul. 29, 1986 [JP] Japan .................. 61-179216
Jul. 29, 1986 [JP] Japan .................. 61-179219

[51] Int. Cl.4 ............................. F16H 37/06
[52] U.S. Cl. .................... 74/665 T; 74/740; 180/248
[58] Field of Search .......... 74/674, 695, 705, 665 GA, 74/665 T, 740, 665 G; 180/249, 248

[56] References Cited

U.S. PATENT DOCUMENTS

| 4,417,642 | 11/1983 | Suzuki et al. ............ 74/740 X |
| 4,428,452 | 1/1984 | Muraoka et al. ............ 180/249 |
| 4,457,394 | 6/1984 | Suzuki ..................... 74/695 X |
| 4,618,022 | 10/1986 | Hayashi ..................... 180/248 |
| 4,700,800 | 10/1987 | Friedrich et al. ............ 74/705 |
| 4,718,301 | 1/1988 | Friedrich .................. 74/705 |
| 4,721,011 | 1/1988 | Kubo et al. ............... 74/665 T |

FOREIGN PATENT DOCUMENTS

| 3533142 | 9/1985 | Fed. Rep. of Germany ...... 180/248 |
| 179425 | 10/1984 | Japan ........................ 180/248 |
| 2109879 | 9/1981 | United Kingdom ............. 74/695 |

Primary Examiner—Leslie A. Braun
Assistant Examiner—Dwight G. Diehl
Attorney, Agent, or Firm—Martin A. Farber

[57] ABSTRACT

A pair of planetary gear devices and a viscous coupling are provided in a power transmitting system. The viscous coupling operates to transmit power of an engine in accordance with the difference between speeds of an input member and output member thereof. One of the members of one of the planetary gear devices is operatively connected to a front drive shaft through the viscous coupling and another member of the other planetary gear device is operatively connected to a rear drive shaft. A pair of change-over coupling devices are provided to selectively lock the planetary gear devices and the viscous coupling.

5 Claims, 10 Drawing Sheets

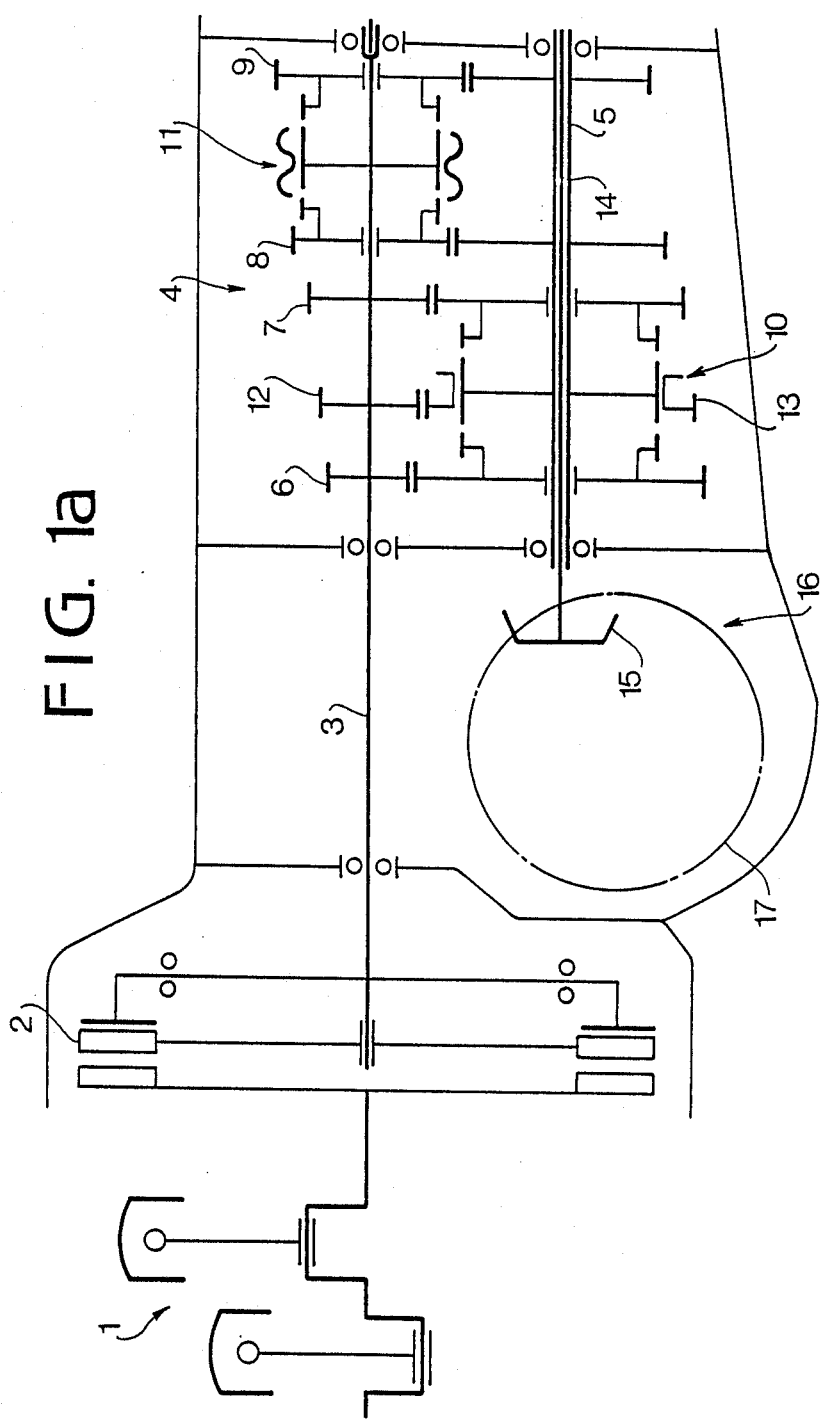

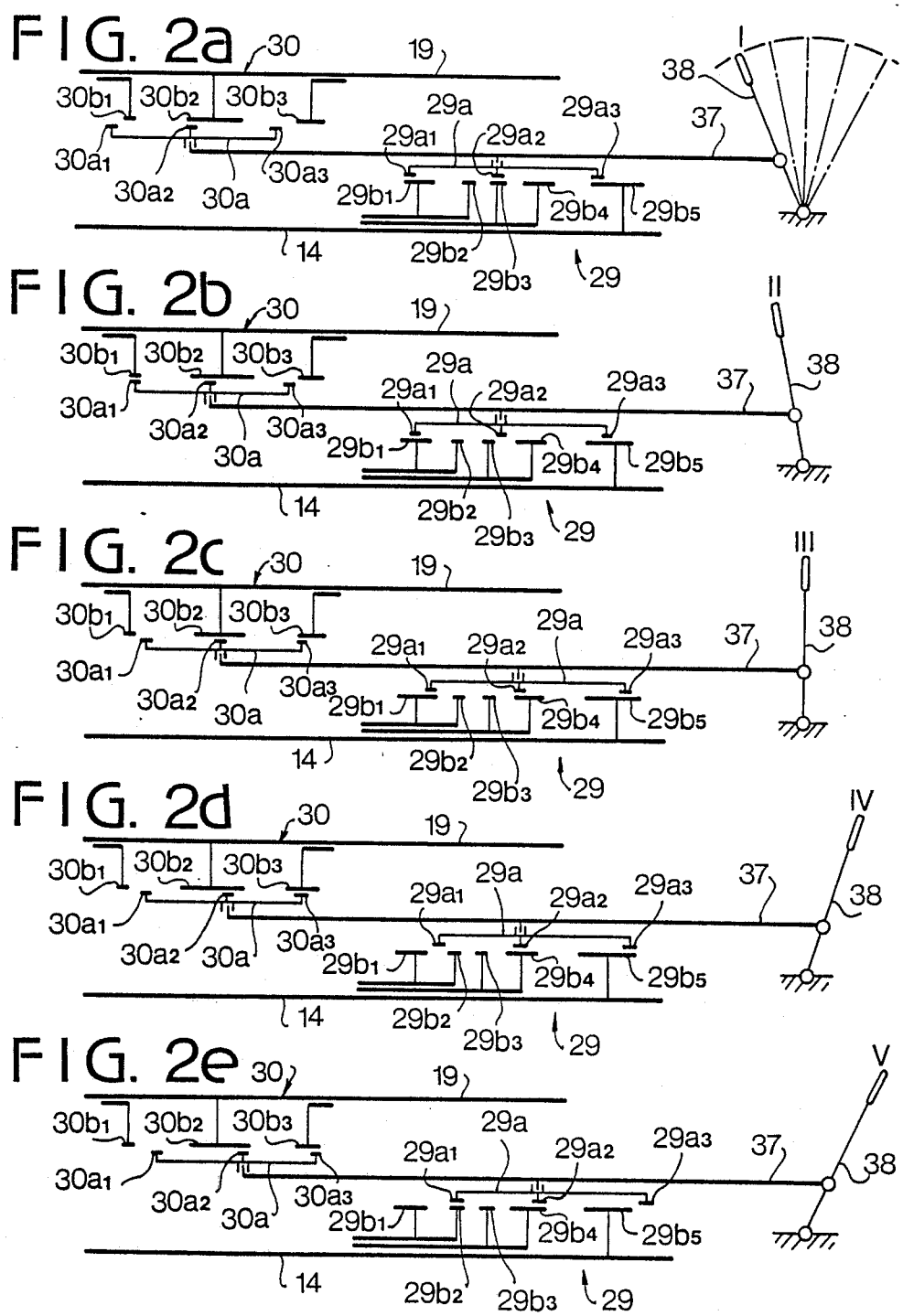

FIG. 3

| POSITION OF SELECTOR LEVER | ENGAGING MEMBERS OF FIRST CHANGE-OVER DEVICE | | | ENGAGING MEMBERS OF SECOND CHANGE-OVER DEVICE | | | VISCOUS COUPLING | TORQUE DISTRIBUTION |
|---|---|---|---|---|---|---|---|---|
| | 29a1 | 29a2 | 29a3 | 30a1 | 30a2 | 30a3 | | |
| I | 29b1 | 29b3 | 29b5 | — | 30b2 | 30a3 | INOPERATIVE | $T_F = T, T_R = 0$ |
| II | 29b1 | — | 29b5 | 30b1 | 30b2 | — | OPERATIVE | $T_F > T_R$ |
| III | 29b1 | 29b4 | 29b5 | — | 30b2 | — | INOPERATIVE | $T_F \fallingdotseq T_R$ |
| IV | — | 29b4 | 29b5 | — | 30b2 | 30b3 | OPERATIVE | $T_F < T_R$ |
| V | 29b2 | 29b4 | — | — | 30b2 | 30b3 | INOPERATIVE | $T_F = 0, T_R = T$ |

FIG. 5

| POSITION OF SELECTOR LEVER | ENGAGING MEMBERS OF FIRST CHANGE-OVER DEVICE | | | | ENGAGING MEMBERS OF SECOND CHANGE-OVER DEVICE | | | | VISCOUS COUPLING | TORQUE DISTRIBUTION |
|---|---|---|---|---|---|---|---|---|---|---|
| | 29a₁ | 29a₂ | 29a₃ | | 30a₁ | 30a₂ | 30a₃ | | | |
| I | 29b₁ | 29b₃ | 29b₅ | | — | 30b₂ | — | | OPERATIVE | $T_F = T$ $T_R = 0$ |
| II | 29b₁ | — | 29b₅ | | 30b₁ | 30b₂ | — | | OPERATIVE | $T_F > T_R$ |
| III | 29b₁ | 29b₄ | 29b₅ | | — | 30b₂ | 30b₃ | | INOPERATIVE | $T_F \fallingdotseq T_R$ |
| IV | — | 29b₄ | 29b₅ | | — | 30b₂ | 30b₃ | | OPERATIVE | $T_F < T_R$ |
| V | 29b₂ | 29b₄ | — | | — | 30b₂ | 30b₃ | | OPERATIVE | $T_F = 0$ $T_R = T$ |

FIG. 8

| POSITION OF SELECTOR LEVER | ENGAGING MEMBERS OF FIRST CHANGE-OVER DEVICE | | | ENGAGING MEMBERS OF SECOND CHANGE-OVER DEVICE | | | VISCOUS COUPLING | TORQUE DISTRIBUTION |
|---|---|---|---|---|---|---|---|---|
| | 53a1 | 53a2 | 53a3 | 54a1 | 54a2 | 54a3 | | |
| I | 53b1 | — | 53b3 | 54b1 | 54b3 | — | INOPERATIVE | $T_F = T$  $T_R = 0$ |
| II | 53b1 | — | 53b3 | — | 54b3 | 54b5 | OPERATIVE | $T_F > T_R$ |
| III | 53b1 | 53b2 | — | 54b2 | 54b3 | 54b5 | INOPERATIVE | $T_F = T_R$ |
| IV | 53b1 | 53b2 | — | 54b2 | — | 54b5 | OPERATIVE | $T_F < T_R$ |
| V | 53b1 | — | — | 54b2 | 54b4 | 54b5 | INOPERATIVE | $T_F = 0$  $T_R = T$ |

4,819,506

POWER TRANSMITTING SYSTEM FOR A FOUR-WHEEL DRIVE VEHICLE

BACKGROUND OF THE INVENTION

The present invention relates to a system for transmitting the power of an engine to four driving wheels of a four-wheel drive vehicle.

In a conventional four-wheel drive vehicle having a central differential, which is called a full time four-wheel drive vehicle, the central differential operates to uniformly distribute the torque of an engine to front wheels and to rear wheels of the vehicle.

It is known that the distribution ratio of torque influences driveability, steerability, stability, starting characteristic and other factors. Namely, when the distribution to the front wheel is increased, a stable cornering characteristic at high vehicle speed is established, and when the distribution to the rear wheels is increased, steerability at low vehicle speed is improved. In the conventional four-wheel drive vehicle, the distribution ratio of torque to the front wheels and to the rear wheels can not be changed.

SUMMARY OF THE INVENTION

The object of the present invention is to provide a system which may change the distribution ratio of torque to front wheels and rear wheels in accordance with driving conditions of a four-wheel drive vehicle.

The other objects and features of this invention will become understood from the following description with reference to the accompanying drawings.

BRIEF DESCRIPTION OF DRAWINGS

FIGS. 1a and 1b are schematic diagram of a four-wheel drive power transmission system in a first embodiment of the present invention;

FIGS. 2a to 2e are diagrams showing engaging conditions of gears and internal teeth in the first and second change-over at five shift positions, respectively;

FIG. 3 is a table showing the state of a viscous coupling and torque distribution at each of the shift positions;

FIG. 5 is a table describing shift positions similar to FIG. 3 in th system of the second embodiment;

FIG. 8 is a table similar to FIG. 5; and

DETAILED DESCRIPTION OF THE PREFERRED EMBODIMENTS

Figure 1B:
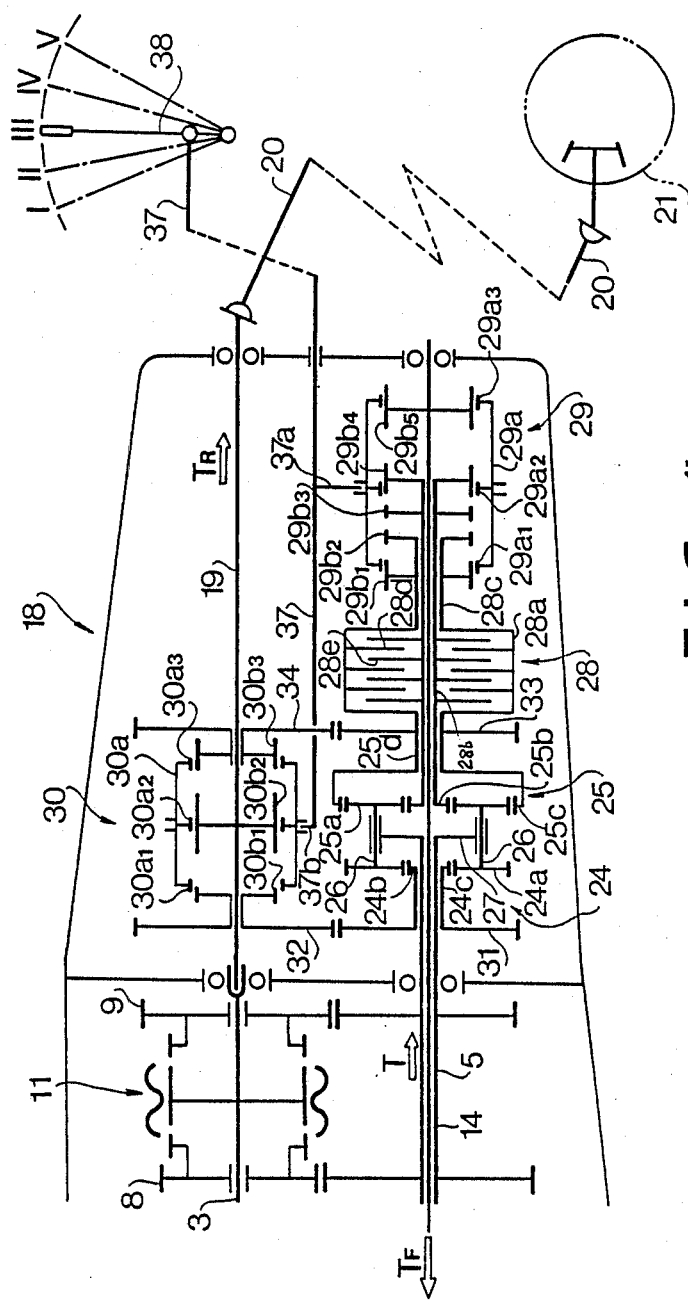

FIG. 1 shows a power transmission system for a four-wheel drive motor vehicle to which the present invention is applied. An engine 1 is longitudinally mounted on the motor vehicle at a front portion thereof, thus forming a transaxle type. The power transmission system housed in a transmission case comprises a clutch 2, transmission 4 and transfer device 18. The transmission 4 has an input shaft 3, a tubular output shaft 5 parallel with the input shaft 3, four pairs of change-speed gears 6 to 9 corresponding to first to fourth speed gears, and synchronizers 10 and 11. The synchronizers 10 and 11 are disposed between the gears 6 and 7 and between 8 and 9, respectively. A reverse drive gear 12 mounted on the input shaft 3 meshes with a gear 13 formed on one side of a sleeve of the synchronizer 10 through an idler gear (not shown) for reverse drive.

A front drive shaft 14 is rotatably supported in the output shaft 5 and by a bearing. A drive pinion 15 at the front end of the shaft 14 meshes with a crown gear 17 of a front differential 16 so as to transmit the power to front wheels of the vehicle.

In a transfer device 18 disposed behind the transmission, a rear drive shaft 19 is disposed parallel to the front drive shaft 14. The rear drive shaft 19 is connected to rear wheels of the vehicle through a propeller shaft 20 and a rear differential 21. The shaft 19 is supported by bearings.

The transfer device 18 has a central differential comprising first and second planetary gear devices 24, 25 disposed in series on the front drive shaft 14 and a viscous coupling 28. The planetary gear device 24 comprises a sun gear 24b and planet pinions 24a in mesh with the gear 24b. The second planetary gear device 25 comprises a sun gear 25b, a ring gear 25c having internal teeth and planet pinions 25a. The corresponding planet pinions 24a and 25a of the first and second planetary gear devices are connected with each other by rods 26. The rods 26 are rotatably supported in a carrier 27 which is connected with the output shaft 5. The sun gear 24b is connected to a gear 31 through a tubular shaft 24c. The gear 31 is in mesh with a gear 32 rotatably mounted on the rear drive shaft 19.

Mounted on the front drive shaft 14 at the output side of the second planetary gear device 25 is the viscous coupling 28. The viscous coupling 28 comprises a housing 28a having a plurality of outer disks 28d, a hub 28b rotatably mounted on the front drive shaft 14 and having a plurality of inner disks 28e, and a high viscous fluid contained in the housing 28a. The disks are alternately arranged in the axial direction of the coupling 28. The housing 28a is connected to the ring gear 25c of the second planetary gear device 25 through a tubular shaft 25d and the hub 28b is connected to the sun gear 25b. When there is a speed difference between the housing 28a and the hub 28b, the viscous coupling operates to generate torque in dependency on the difference. Thus, the torque is transmitted from a higher speed disk side to a lower speed disk side.

Change-over coupling devices 29 and 30 are provided on the front and rear drive shafts 14 and 19, respectively. The change-over coupling device 29 comprises a selector sleeve 29a and five gears $29b_1$ to $29b_5$. The gears $29b_1$ and $29b_2$ are securely mounted on a tubular shaft 28c which is integral with the housing 28a of the viscous coupling 28. The gears $29b_3$ and $29b_4$ are securely mounted on the hub 28b. The gear $29b_5$ is securely mounted on the front drive shaft 14. The selector sleeve 29a has inner teeth $29a_1$ selectively capable of meshing with the gear $29b_1$ or with $29b_2$, has inner teeth $29a_2$ selectively capable of meshing with the gear $29b_3$ or with $29b_4$, and inner teeth $29a_3$ selectively capable of meshing with the gear $29b_5$.

The second change-over coupling device 30 comprises a selector sleeve 30a, gear $30b_1$ integral with the gear 32, a gear $30b_2$ securely mounted on the rear drive shaft 19 and a gear $30b_3$ integral with a gear 34 which in turn meshes with a gear 33 fixedly mounted on the shaft 25d. The selector sleeve 30a has internal teeth $30a_1$, $30a_2$ and $30a_3$ which selectively mesh with the gears $30b_1$, $30b_2$ and $30b_3$, respectively. A selector lever 38, which can be shifted to positions I to V depending on the driving conditions or at the preference of the driver, is provided so as to change the positions of the selector sleeve 29a and 30a through a rod 37 having a fork 37a for the sleeve 29a and a fork 37b for the sleeve 30a.

The power of the engine 1 is transmitted to the transmission 4 through the clutch 2 and the input shaft 3 and further to the carrier 27 of the first and second planetary gear devices 24, 25 in the transfer device 18. The torque is transmitted to the front wheels through a front power path of the transfer device 18 comprising the second planetary gear device 25, first change-over device 29, front drive shaft 14 and front differential 16. The torque is transmitted to the second change-over device 30 either through the first planetary gear device 24 and gears 31, 32 or through the second planetary gear device 25 and gears 33, 34. The torque is further transmitted to the rear wheels through rear drive shaft 19, propeller shaft 20 and rear differential 21. These members comprise a rear power path of the transfer device 18 for transmitting the output power of the transmission 4 to the rear wheels.

The operation of the present system is described hereinafter with reference to FIGS. 2a to 2e and to FIG. 3.

When the selector lever 38 is at the position I, the gear $30b_1$ and the gear $30b_3$ do not engage with teeth $30a_1$ and $30a_3$ of the selector sleeve 30a as shown in FIG. 2a so that the torque is not transmitted to the rear wheels. Thus, the output torque T of the transmission 4 is entirely transmitted to the front wheels as front torque $T_F$ ($T_F=T$). Accordingly, two-wheel driving is established thereby providing driving stability at high vehicle speed. At the position I, since the gear $29b_1$ meshes with the internal teeth $29a_1$ and gear $29b_3$ meshes with teeth $29a_2$, the first change-over coupling device 29 operates to directly connect the housing 28a of the coupling 28 with the hub 28b and to connect the sun gear 25b with the ring gear 25c to lock the differential mechanism. Accordingly, the coupling 28 and the second planetary gear device are inoperative.

When the selector lever 38 is at position II, selector sleeves 29a and 30a are at the position shown in FIG. 2b. Consequently, the front torque $T_F$ is transmitted to the front drive shaft 14 through the output shaft 5, carrier 27, planet pinions 25a, ring gear 25c, housing 28a, gear $29b_1$, internal teeth $29a_1$, $29a_3$ and the gear $29b_5$. The rear torque $T_R$ is transmitted to the rear drive shaft 19 through carrier 27, planet pinions 24a and sun gear 24b of the first planetary gear device 24, gears 31, 32, gear $30b_1$, internal teeth $30a_1$, $30a_2$ and gear $30b_2$. The difference between the speed of the front and rear wheels is absorbed as the planet pinions 25a walk around the sun gear 25b and on the ring gear 25c. Thus, the planetary gear device 25 operates as a central differential. Accordingly, a full time four-wheel driving mode with the central differential function is established. Since the torque is transmitted to the to rear wheels and front wheels through the sun gear 24b and the ring gear 25c, respectively, the torque is distributed in accordance with the difference between the gear ratios of the sun gear 24b and the ring gear 25c (the diameter of the ring gear is larger than the sun gear). Therefore, the torque $T_F$ of the front wheels is larger than the torque $T_R$ of the rear wheels($T_F>T_R$).

When the front wheels, to which greater torque is transmitted, skid, the housing 28a operatively connected to the front wheels rotates faster than the hub 28b. The difference of the rotational speeds between inner disks 28e and outer disks 28d generates coupling torque $T_C$ which is transmitted to the lower speed side, namely, to the inner disks 28e. Thus, the rear torque becomes large ($T_R+T_C$) and the front torque $T_F$ temporarily reduces to $T-(T_R+T_C)$ so that the vehicle can easily get out of a stuck state by the increased rear torque.

When the lever 38 is shifted to the position III, as shown in FIG. 2c, the housing 28a and hub 28b of viscous coupling 28 are coupled by the respective engagement of the gears $29b_1$ and $29b_4$ with internal teeth $29a_1$ and $29a_2$ to lock the coupling as a differential mechanism. In the second planetary gear device 25, since the sun gear 25b and the ring gear 25c are coupled, torque is uniformly distributed to the front and rear wheels providing a four wheel driving ($T_F \approx T_R$). Since the gear $30b_1$ disengages with the internal teeth $30a_1$ and the gear $30b_3$ engages with the internal teeth $30a_3$, the torque $T_R$ is transmitted to the rear drive shaft 19 through the gears 33 and 34. Thus, driveability on rough roads and stable driving on road having low coefficient of friction are improved.

When the lever 38 is further shifted to the position IV, the viscous coupling 28 again becomes operative to enable a center differential action since the internal teeth $29a_1$ engages with neither gears $29b_1$, $29eb_2$ as shown in FIG. 2d. The front torque $T_F$ is transmitted to the front drive shaft 14 through the sun gear 25b of the second planetary gear device 25, hub 28b, gear $29b_4$, internal teeth $29a_2$ and $29a_3$ and gear $29b_5$. The rear torque $T_R$ is transmitted to the rear drive shaft 19 through the ring gear 25c, shaft 25d, gears 33, 34, gear $30b_3$, internal teeth $30a_3$, $30a_2$ and gear $30b_2$. Since the sun gear 25b is smaller than the ring gear 25c, the front torque $T_F$ is smaller than the rear torque $T_R$ ($T_F<T_R$), thereby improving cornering power and starting characteristic. If the rear wheels skid under the present condition, the front torque is increased similarly as described in the case of position II.

When the selector lever 38 is shifted to the position V the rod 37 is moved to the position shown in FIG. 2e. Since the gear $29b_5$ and teeth $29a$ of the sleeve 29a are disengaged, torque is not transmitted to the front wheels. As a result, the entire torque T is transmitted to the rear drive shaft 19 through the ring gear 25c, shaft 25d, gears 33, 34, gear $30b_3$, internal teeth $30a_2$ and gear $30b_2$. Accordingly, cornering power of the vehicle is improved.

FIG. 3 shows the above-described coupling states and torque distribution.

Figure 4:
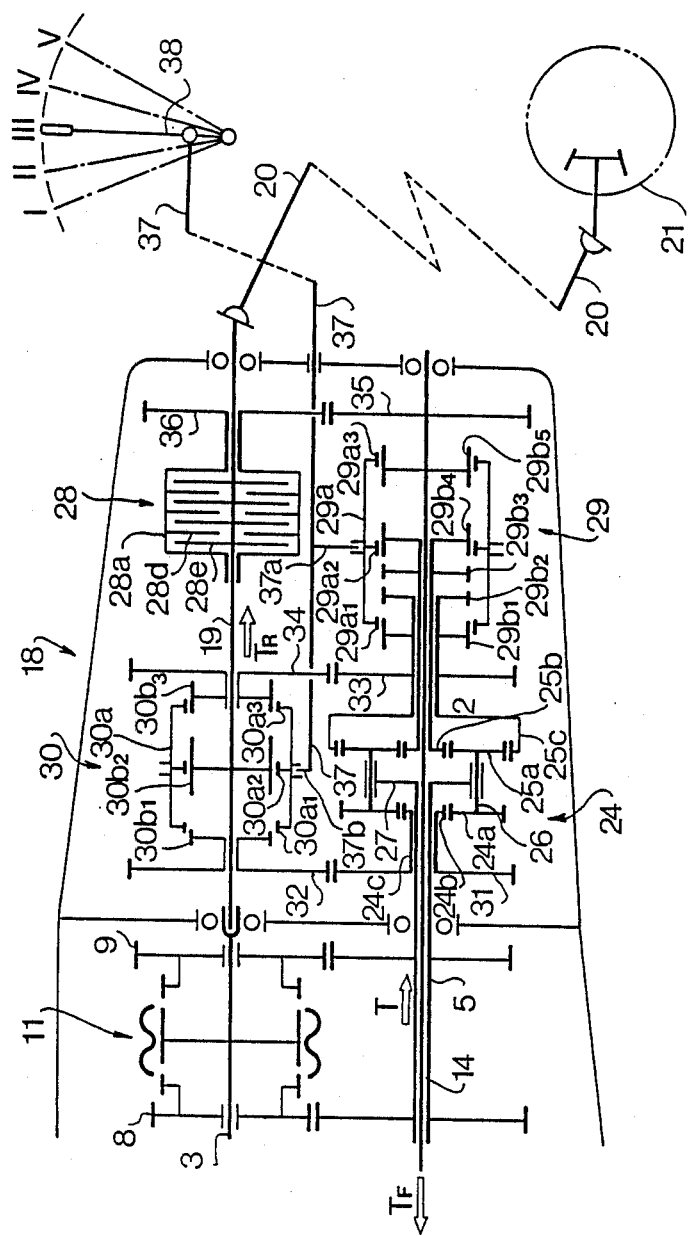
FIG. 4 is a schematic diagram of a four-wheel drive power transmission system in a second embodiment of the present invention.

Referring to FIG. 4 showing a transfer device of the second embodiment of the present invention, the construction is the same as the first embodiment but for the disposition of the viscous coupling 28. The same parts as the first embodiment are identified with the same references as FIG. 1. The viscous coupling 28 in the present embodiment is disposed on the rear drive shaft 19 at the output side of the second change-over device 30. The inner disks 28e are directly secured to the rear drive shaft 19 which serves as hub 28b of FIG. 1. The housing 28a having outer disks 28c is integral with a gear 36 which meshes with a gear 35 securely mounted on the front drive shaft 14. Consequently, the ring gear 25c of the second planetary gear device 25 is directly connected with the gears $29b_1$ and $29b_2$ and sun gear $25b$ is connected to the gears $29b_3$ and $29b_4$ through a tubular shaft $25e$.

The torque is transmitted to the front wheels and to the rear wheels in the same manner as in the first embodiment through the respective front and rear power paths of the transfer device. The operation of the system in the second embodiment is described in the table of FIG. 5, and the positions of the selector sleeves $29a$ and $30a$ of the first and second change-over coupling devices 29 and 30 at positions I to V are the same as those shown in FIGS. 2a to 2e.

At position I of the selector lever 38, the rod 37 is at a position most to the left so that the internal teeth $29a_1$, $29a_2$, $29a_3$ engages the gears $29b_1$, $29b_3$ and $29b_5$, respectively, in the first change-over coupling device 29, and the internal teeth $30a_2$ engage the gear $30b_2$ in the second change-over coupling device 30. Accordingly, the ring gear $25c$ and the sun gear $25b$ are coupled to lock the second planetary gear device 25. Since neither of the gears $30b_1$, $30b_3$ is in engagement with the selector sleeve $30a$, torque is not transmitted to the rear wheels. Thus, torque T is transmitted only to the front drive shaft 14 through the second planetary gear device 25 and the first change-over coupling device 29 ($T_F=T$). When the front wheels skid causing the front drive shaft 14 to idly rotate at high speed, the viscous coupling 28 operates to apply a part of the front torque to the rear drive shaft 19 depending on the speed difference between the housing $28a$ and the rear drive shaft 19. Thus, the vehicle is temporarily in four wheel driving state to stop the skidding of the front wheels.

When the lever 38 is a the position II as shown in FIG. 2b, neither gear $29b_3$ nor the gear $29b_4$, both of which are connected with the sun gear $25b$ of the second planetary gear device 25, is engaged with the sleeve $29a$. Thus, the front torque $T_F$ is transmitted to the front drive shaft 14 through the ring gear $25c$, gear $29a_1$, internal teeth $29a_1$, $29a_3$ and gear $29b_5$. The rear torque $T_R$ is transmitted to the rear drive shaft 19 through the planet pinions $24a$, sun gear $24b$ of the first planetary gear device 24, gears 31, 32, gear $30b_1$, internal teeth $30a_1$, $30a_2$ and gear $30b_2$. Since the ring gear $25c$ is larger than the sun gear $24b$, the front torque $T_F$ is larger than the rear torque $T_R$ ($T_F>T_R$) The viscous coupling 28 operates in the same manner as before.

At the position III, the shafts $25d$ and $25e$ are directly connected by the engagement of the gears $29b_1$ and $29b_4$ with internal teeth $29a_1$, $29a_2$, respectively, thereby coupling the sun gear $25b$ with the ring gear $25c$. Thus, the front and rear torques are equal ($T_F \approx T_R$) Since the gear $30b_3$ engages the internal teeth $30a_3$, the rear torque $T_R$ is transmitted to the rear drive shaft 19 through the second planetary gear device 25, shaft $25e$, gear 33, 34, gear $30b_3$, internal teeth $30a_3$, $30a_2$ and gear $30b_2$. During such a condition, the rotational speed of the housing $28a$ of the coupling 28 which is rotated with the drive shaft 14 through gears 35, 36 is the same as that of the rear drive shaft 19. Consequently, the coupling 28 is inoperative.

At the position IV, the front torque $T_F$ is transmitted to the front drive shaft 14 through the sun gear $25b$, and the gear $29b_4$ and the rear torque $T_R$ is transmitted to the rear drive shaft 19 through the ring gear $25c$, gears 33, 34 and coupling device 30. The front torque $T_F$ is smaller than the rear torque ($T_F<T_R$) because of the gear ratio between the sun and ring gears $25b$ and $25c$.

When the lever 38 is shifted to the position V, the gear $29b$ is disengaged from the selector sleeve $29a$. The engagements of the gear $29b_2$ with the internal teeth $29a_1$ and the gear $29b_3$ with teeth $29a_2$ couple the sun gear $25b$ and the ring gear $25c$ to lock the second planetary gear device 25. Accordingly, the entire torque T is transmitted to the rear wheels as the rear torque $T_R$ ($T_R=T$).

Figure 6:
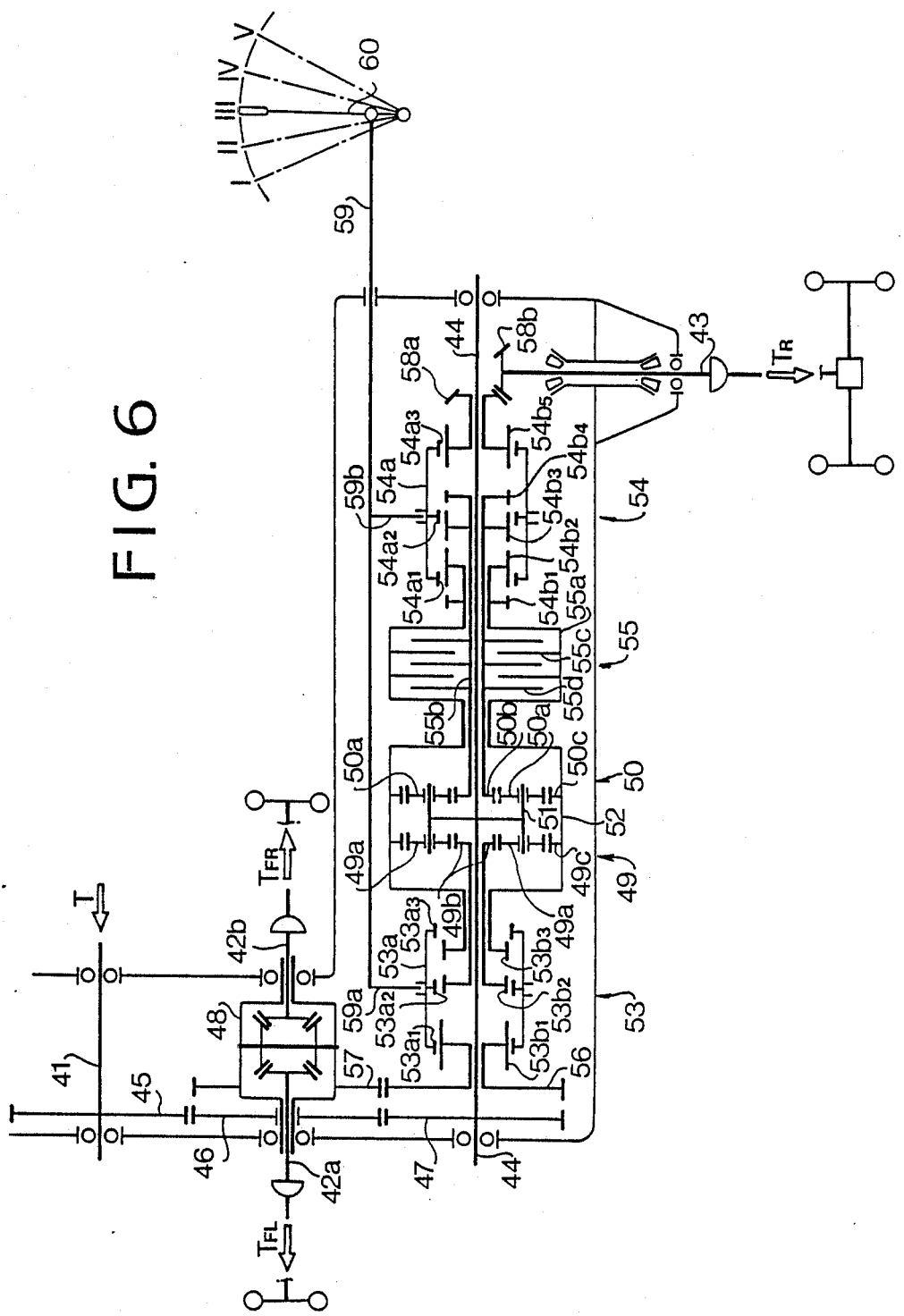
FIG. 6 a schematic diagram of a power transmission system in a third embodiment of the present invention.

Referring to FIG. 6, the third embodiment of the present invention is applied to a motor vehicle having a laterally mounted engine. An output shaft 41 through which torque T of a transmission is transmitted is provided with a gear 45 securely mounted thereon. The gear 45 is in mesh with a gear 46 which in turn meshes with a gear 47 fixedly mounted on a transfer shaft 44 of the transfer device supported in a transmission case by bearings. The output of the transmission is transmitted to the front and rear wheels of the vehicle by front and rear power paths of the transfer device. First and second planetary gear devices 49 and 50 of the transfer device are mounted on the transfer shaft 44 and housed in a housing 52. The first planetary gear device 49 comprises a planet pinions $49a$, a sun gear $49b$ and a ring gear $49c$ integral with housing 52. The second planetary gear device 50 comprises planet pinions $50a$, a sun gear $50b$ and a ring gear $50c$ which is integral with the housing 52. A common carrier 51 for the two planetary gear devices 49 and 50 is fixedly mounted on the transfer shaft 44.

A viscous coupling 55 of the transfer device disposed on the transfer shaft 44 comprises a hub $55b$ having inner disks $55d$ and a housing $55a$ having outer disks $55c$. The hub $55b$ is connected with the sun gear $50b$ of the second planetary gear device 50 and the housing $55a$ is connected with the housing 52 of the planetary gear devices.

A first change-over coupling device 53 has a selector sleeve $53a$ having internal teeth $53a_1$, $53a_2$, $53a_3$ and gear $53b_1$, $53b_2$, $53b_3$. The gear $53b_3$ is connected with the housing 52 and the gear $53b_2$ with the sun gear $49b$ of the first planetary gear device 49. The gear $53b_1$ is integral with a gear 56 which meshes with a gear 47 secured to a case of a front differential 48. The front differential 48 has front axles $42a$, $42b$ for transmitting front torque $T_F$ to right and left front wheels ($T_{FL}+T_{FR}=T_F$).

A second change-over coupling device 54 is provided adjacent the coupling 55 on the transfer shaft 44. The second change-over coupling device 54 comprises a selector sleeve $54a$ and five gears $54b_1$ to $54b_5$. The gear $54b_1$ and $54b_2$ are integral with the housing $55a$ of the viscous coupling 55 and the gear $54b_3$ and $54b_4$ are fixedly mounted on the extension of the hub $55b$. The gear $54b_5$ is secured to a bevel gear $58a$ which meshes with a bevel gear $58b$ formed on a rear drive shaft 43 connected with a propeller shaft for transmitting rear torque $T_R$ to rear wheels.

The selector sleeves $53a$ and $54a$ of the change-over coupling devices 53, 54 are moved by the operation of the selector lever 60. The lever 60 is connected with a rod 59 having forks $59a$ and $59b$ respectively engaged with the sleeves $53a$ and $54a$. The lever is selectively shifted to positions I to V depending on the driving conditions.

Torque T from the output shaft 41 is transmitted through gears 45, 46 and 47 and transfer shaft 44 to the first and second planetary gear devices 49 and 50 where the torque is distributed to the first and second change-over coupling devices 53 and 54 for the front and rear wheels, respectively.

The operation of the power transmitting system in the third embodiment is described hereinafter with reference to FIGS. 7a to 7e and 8.

Figure 7A:
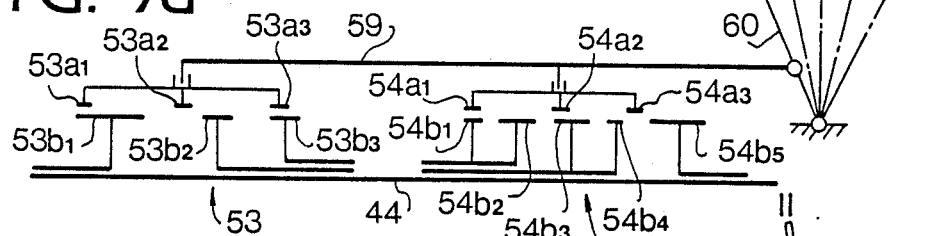
FIGS. 7a to 7e are diagrams showing engaging conditions in the third embodiment of the present invention.
Figure 7B:
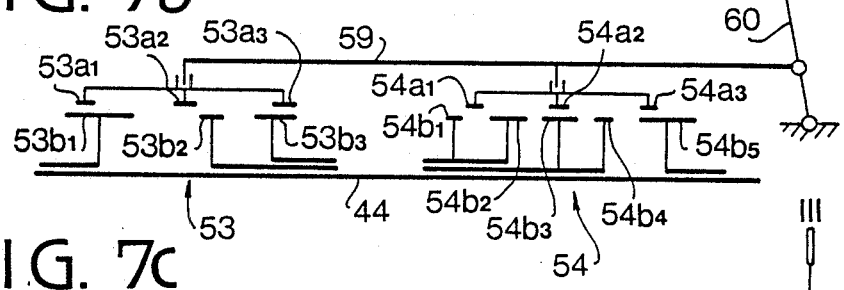

When the selector lever 60 is at the position I as shown in FIG. 7a, internal teeth $53a_1$ and $53a_3$ are engaged with the gears $53b_1$ and $53b_3$, respectively. Thus, torque $T_F$ is transmitted to the differential 48 through the transfer shaft 44, carrier 51, planet pinions 49a, ring gear 49c, housing 52, gear $52b_3$, internal teeth 53a, 53a and gear $53b_1$, and gear 56 and 57. The gear $54b_5$ is disengaged from the sleeve 54a so that torque is not transmitted to the rear wheels. Thus, whole torque T is transmitted to the front wheel ($T_{FL} + T_{FR} = T$). On the other hand, since the gear $54b_1$ engages the internal teeth $54a_1$ and the gear $54b_3$ engages the teeth $54a_2$, the housing 55a and the hub 55b are coupled so as to prevent the relative rotation thereof, thereby rendering the coupling 55 inoperative. The first and second planetary gear devices are also locked.

When the lever 60 is shifted to the position II, the front torque $T_F$ is transmitted to the differential 48 through planet pinions 49a, ring gear 49c, housing 52, gear $53b_3$, internal teeth $53a_3$, internal teeth $53a_1$ and gear $53b_1$. On the other hand, the rear torque is transmitted to the rear drive shaft 43 through the planet pinions 50a, sun gear 50b, hub 55b of the viscous coupling 55, gear $54b_3$, teeth $54a_2$ and $54a_3$, gear $54b_5$ and bevel gears $58_a$ and $58b$. In accordance with the difference between gear ratios of the ring gear 49c and sun gear 50b, the front torque $T_F$ is larger than the rear torque $T_R$ ($T_F > T_R$). During such a condition, the viscous coupling 55 is operative.

Figure 7C:
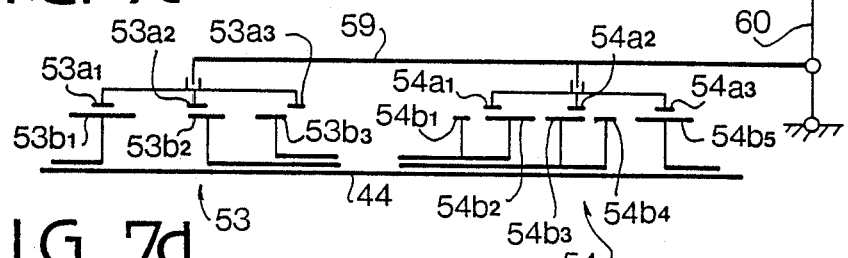

At the position III, the sleeves 53a and 54a are further moved as shown in FIG. 7c. The internal teeth $54a_1$, $54a_2$ and $54a_3$ engage with gears $53b_2$, $54b_3$ and $54b_5$, respectively, so that the viscous coupling 55 and the first and second planetary gear device 50 are locked. Thus, the front differential 48 and the rear drive shaft 43 are directly connected so that the torque T is uniformly distributed to the front and rear wheels ($T_F \approx T_R$).

Figure 7D:
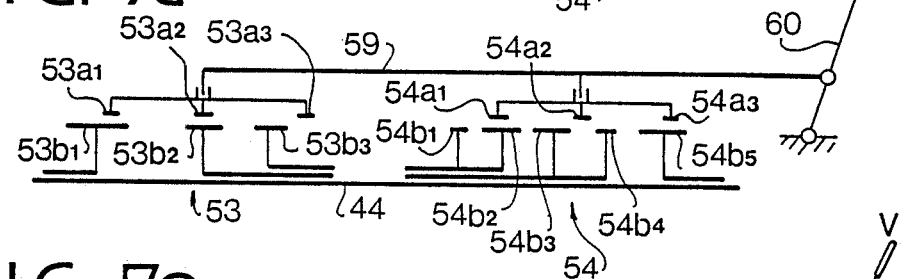

In FIG. 7d, the lever 60 is shifted to the position IV to release the engagement of the internal teeth $54a_2$ with gear $54b_3$, thereby rendering the viscous coupling 55 operative. The front torque $T_F$ is transmitted to the front wheels through the carrier 51, planet pinions 49a, sun gear 49b, gear $53b_2$, internal teeth $53a_2$ and $53a_1$ and gear $53b_1$. On the other hand, the rear torque $T_R$ is transmitted to the rear drive shaft 43 through the carrier 51, planet pinions 50a, ring gear 50c, housing 52, gears $54b_2$, internal teeth $54a_1$, $54a_3$ and gear $54b_5$. Since the ring gear 50c is larger than sun gear 49b, the rear torque $T_R$ is larger than the front torque $T_F$ ($T_F > T_R$) The coupling 55 is operative during the condition.

Figure 7E:
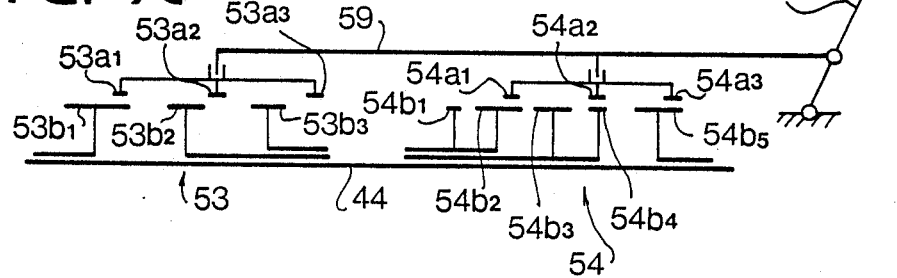

In the position V shown in FIG. 7e, neither the gear $53b_2$ nor the gear $53b_3$ engages with the selector sleeve 53a so that torque is not transmitted to the front wheels. The gears $54b_2$, $54b_4$ and $54b_5$ engage with the internal teeth $54a_1$, $54a_2$, $54a_3$, respectively so as to lock the viscous coupling 55 and the second planetary gear device 50. Thus, the torque T is transmitted to the rear wheels ($T_R = T$).

Figure 9A:
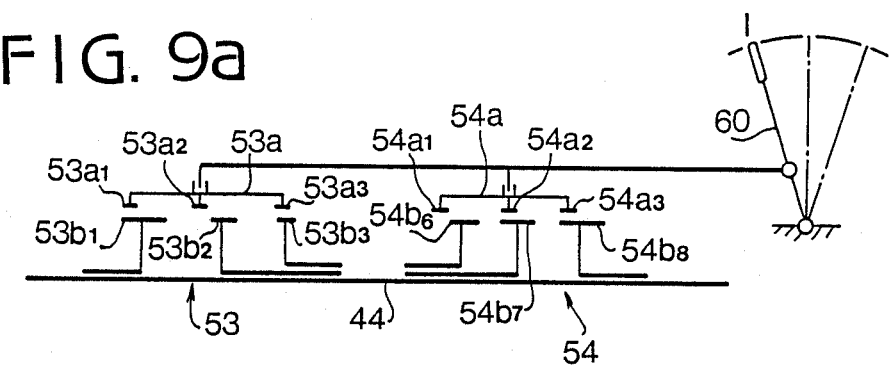
FIGS. 9a to 9c are diagrams showing engaging conditions in a fourth embodiment of the present invention.
Figure 9B:
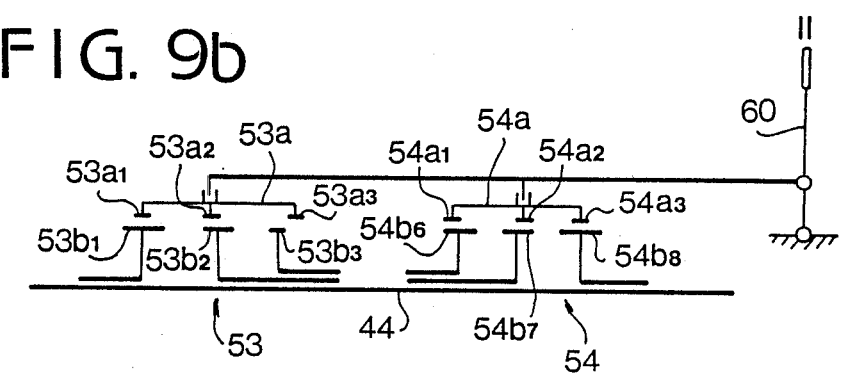
Figure 9C:
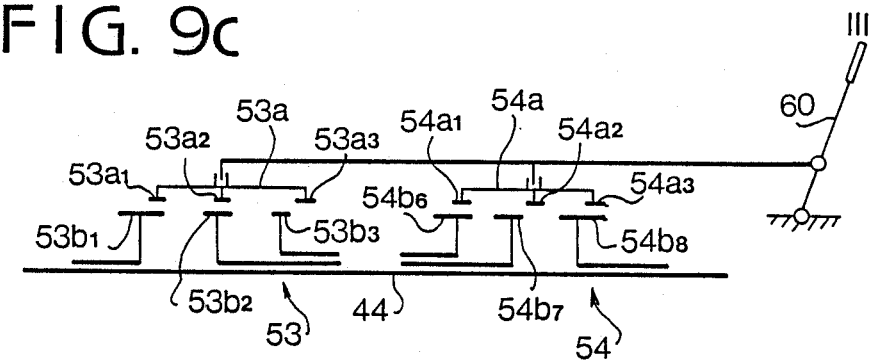

The system in the fourth embodiment of the present invention shown in FIGS. 9a to 9c is constructed roughly the same as that of the third embodiment. However, the second change-over coupling device 54 has only three gears $54b_6$, $54b_7$ and $54b_8$. Thus, the selector lever 60 is capable of selecting three position I to III. The positions of the sleeves 53a and 54a for positions I to III shown in FIGS. 9a to 9c correspond to the positions II, III and IV in FIGS. 7b, 7c and 7d respectively. Thus, operation are the same as the system of the third embodiment except for the fact that in the present system, positions where front torque $T_F$ or the rear torque $T_R$ is zero cannot be selected.

Although in the afore-described embodiments, the first and second change-over coupling devices are manually controlled, they may be controlled electrically or pneumatically.

In accordance with the present invention, there is provided a torque distribution system wherein the distribution ratio of the torque to the front and the rear wheels can be changed in accordance with the driving conditions or at the preference of the driver. Since a viscous coupling is employed, the skidding of wheels can be effectively prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a power transmitting system for a four-wheel drive vehicle having an engine, front and rear wheels, a transmission for transmitting power of the engine through a clutch, and a transfer device including a front power path to transmit output power of the transmission to the front wheels and a rear power path to transmit the output power to the rear wheels, respectively, the improvement wherein the transfer device comprises means comprising,
    center differential means for permitting variable speed difference between the front and rear power paths, and
    torque ratio providing means from providing a plurality of torque ratios between the front and rear power paths and a locking condition of the center differential means, and the transfer device further comprising
    selecting means for selecting at least one of the plurality of torque ratios and the locking condition to select output conditions of the torque ratio providing means in accordance with at least one of driving conditions and a preference of a driver of the vehicle so as to improve driveability of the vehicle.

2. The system according to claim 1, wherein
    the torque ratio providing means further for providing
    a front wheel driving position for transmitting the output power of the transmission to the front wheels via the front power path without transmitting the output power of the transmission to the rear wheels through the rear power path, and
    a rear wheel driving position for transmitting the output power of the transmission to the rear wheels via the rear power path without transmitting the output power of the transmission to the front wheels through the front power path,
    said selecting means for selecting at least one of the driving positions to obtain a two-wheel drive condition of the vehicle.

3. The system according to claim 1, wherein
    the transfer device comprises, a first planetary gear device and a second planetary gear device connected to each other and comprising the center differential means and the torque ratio providing means.

4. The system according to claim 3, wherein
the transfer device further comprises a viscous coupling having two sets of relatively movable members, said two sets being connected to a sun gear and a ring gear, respectively, of one of the planetary gear devices, and a first change-over coupling means for selectively coupling either one of the sets of the viscous coupling, both of said sets and none of said sets with both of said sets coupled to each other, to one of the front and rear said sets coupled to each other, to one of the front and rear wheels.

5. The system according to claim 1, wherein
the plurality of torque ratio comprise front torque larger than rear torque, front torque equal to rear torque, and front torque smaller than rear torque.

* * * * *